(No Model.)

G. W. CLAYTON.
Elevator.

No. 238,762. Patented March 15, 1881.

Witness:
C. D. O'Connor
F. W. Cadmell

Inventor:
George W. Clayton
by Geo. W. Tibbitts, Atty.

UNITED STATES PATENT OFFICE.

GEORGE W. CLAYTON, OF CLEVELAND, OHIO.

ELEVATOR.

SPECIFICATION forming part of Letters Patent No. 238,762, dated March 15, 1881.

Application filed July 10, 1880. (No model.)

*To all whom it may concern:*

Be it known that I, GEORGE W. CLAYTON, of Cleveland, in the county of Cuyahoga and State of Ohio, have invented certain new and useful Improvements in Elevators, of which the following is a specification.

Figure 2:
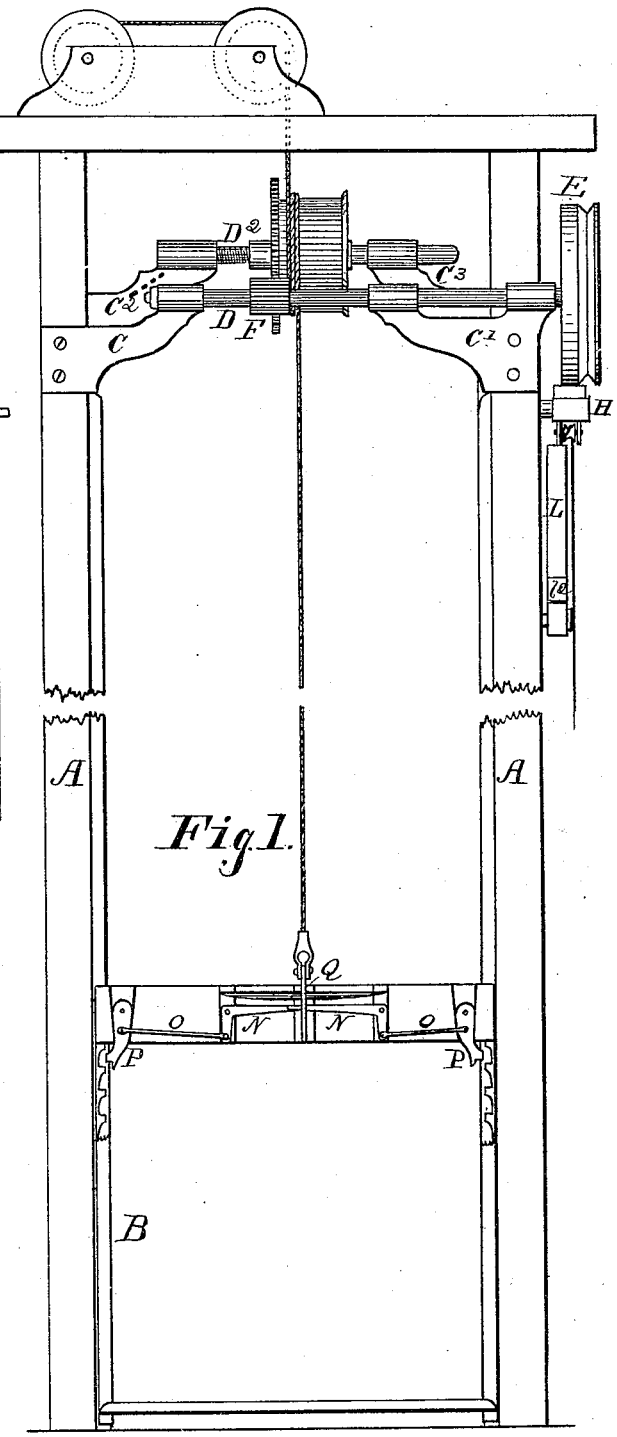
Figure 1:
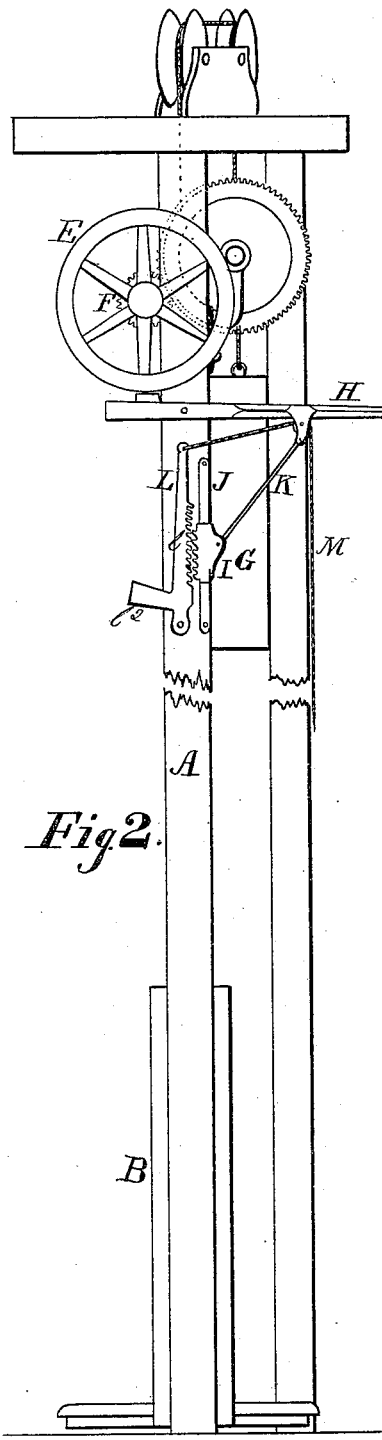

In the accompanying drawings, Figure 1 is a front elevation. Fig. 2 is a side elevation.

The nature and objects of these improvements will fully appear in the subjoined description when considered in conjunction with the accompanying drawings.

A A are the two upright posts between which the carriage B travels. They are provided with the necessary guide-grooves and racks. To the upper part of the said posts A A are attached brackets C C' $C^2$ $C^3$, of peculiar construction, with the bearings for the shafts D $D^2$ brought near together in the central part of the frame, for the purpose of lessening the distance between bearings and shortening the shafts to avoid their springing and prevent the danger of the gearing becoming disconnected. On the shaft D, which is the driving-shaft, having the driving-pulley E attached, is an elongated pinion, F, the purpose of which will be hereinafter shown. The drum-shaft $D^2$ is made to traverse back and forth in its bearings by having cut on one end a screw-thread, which plays in the threaded bearing on the bracket $C^2$. This is done by the revolutions of the drum-shaft, and is for the purpose of keeping the take-up of the rope on the drum directly over the center. For this reason the pinion E is made elongated. The rope is passed around the drum a few times, and then over two pulleys above, and is attached to a counterbalance-weight, G. This constitutes the first part of my improvements.

To one of the posts A is attached a brake-lever, H, provided with a clutching device for holding it in place when desired. It consists of a sliding rack-block, I, arranged between two guides, J, on the post A, and connected to the lever H by a rod, K, by means of which said rack-block is moved. In connection with said rack-block is a lever, L, provided with a rack, $l$, along one side to engage with the rack on the aforesaid block. It has a weight, $l^2$, attached for holding it off from the rack-block when not wanted to hold the same. To the top end of the said lever is attached a cord, M, for operating it, which passes over a small pulley on the under side of lever H. This constitutes the second part of my improvements.

It will be seen from the foregoing that the first advantage in these improvements is the arrangement of the bearings on brackets in such a manner as to insure against the springing of the shafts, and provides for traversing of the drum to keep the rope perpendicular, and makes the whole in a close and compact form, rendering other posts unnecessary.

The advantage of the second part is safety in the brake device.

Having described my invention, I claim—

1. The brackets C C' $C^2$ $C^3$, provided with the bearings, as shown, for shortening the shafts D $D^2$, the shaft D, carrying the elongated pinion F, and the shaft $D^2$, carrying the drum, the said shaft $D^2$ having a screw-thread cut on one end and playing in the threaded bearing $C^2$, whereby the drum is made to traverse back and forth, substantially as and for the purpose specified.

2. The combination, with the brake-lever H, of the clutch-block I, connected therewith by the rod K, the weighted rack-lever L, and the cord M, for the purpose specified.

G. W. CLAYTON.

Witnesses:
  GEO. W. TIBBITTS,
  F. W. CADWELL.